United States Patent Office 3,684,566
Patented Aug. 15, 1972

3,684,566
ACYLATED ALCOHOLATES OF POLYVALENT METALS
Friedrich Josten, Rheinkamp-Utfort, and Willi Lücker, Homburg, Germany, assignors to Deutsche Texaco Aktiengesellschaft, Hamburg, Germany
No Drawing. Filed Dec. 29, 1969, Ser. No. 888,833
Claims priority, application Germany, Jan. 18, 1969, P 19 02 509.3
Int. Cl. D06m 13/50
U.S. Cl. 117—135.5          4 Claims

ABSTRACT OF THE DISCLOSURE

Process for rendering fibrous material water-repellent comprising treating the material with an organic solution of the reaction product of an alcoholate of titanium, aluminum, or zirconium, and an alkyl-substituted succinic anhydride or mono ester thereof, said alkyl substituent having at least four carbon atoms.

---

The invention relates to the preparation of acylated alcoholates of polyvalent metals, preferably acylated aluminum alcoholates, as well as the use of these products for the water repellency of fibrous materials, cardboard and the like and to the surface treatment of glass, glass fibers and mineral fibers.

As is known, textiles, fiber materials and the like can be made water repellent by impregnating them with solutions of alcoholates of aluminum, titanium, zirconium, magnesium, and other polyvalent metals in organic solvents. Such solutions, however, are only stable for short times and the water repelling properties of the alcoholates are usually of short duration. It is also known to use acid derivatives of these metals, for instance the formates, acetates, stearates, and the like, alone or, usually, in combination with aqueous wax or aqueous paraffin emulsions, for water repellency of fibrous materials. Aqueous mixtures of this type lead easily to swelling and wrinkling tendencies of the fibrous materials which on subsequent drying treatment frequently shrink and deform.

Attempts have been made to remedy these difficulties by using acylation products, preferably of aluminum alcoholates, in organic solvents for water repellency treatment of textiles and the like.

The acylation of alcoholates of polyvalent metals, of which aluminum will be referred to herein as the most common one, with carboxylic acids and their derivatives is known. Depending on the type and mole ratio of the starting materials acylation products are obtained which are suitable as thickening agents, water repellency agents, synthetic type lacquer raw materials, catalysts for esterification and trans-esterification, hardeners for synthetic materials and similar purposes.

Thus, according to German Pat. 853,354 an aluminum alcoholate is reacted with a dicarboxylic acid anhydride in a mole ratio of 1:3 for which a suitable solvent is the alcohol employed in the alcoholate. After distilling off the excess solvent hard, clear, synthetic type products are obtained which are completely insoluble in water, but which are more or less soluble in various organic solvents. The water resistance of the reaction products improves with increasing degrees of acylation but their solubility in the usual lacquer solvents decreases.

In order to improve the solubility of acylated aluminum alcoholates, particularly in benzene and other hydrocarbons, one method according to German Pat. 977,008 provides for the reaction of one mole of an alcoholate with less than 1 mole of a higher monocarboxylic acid. After distilling off the solvents, oily to waxy products are obtained which can be used in the lubricating, fuel, or lacquer industries. According to German addition Pat. 977,507, the reaction is to be carried out at a low temperature, and according to a further German addition Pat. 977,378 the acylation product obtained at this low temperature is to be heated subsequently to a higher temperature.

Another process for the preparation of aluminum containing organic synthetic materials, by the reaction of one mole of aluminum alcoholate with less than one mole of carboxylic acid compound, has been described in German Pat. 1,032,543. According to this patent, one can start with an aluminum compound which contains for each equivalent of aluminum, 0.5 to 1 equivalent of ether-type bonded residues and other residues of enolizable compounds such as acetylacetone, acetoacetic acid ester and the like. The stabilization of the products against hydrolysis by the influence of complex forming volatile organic materials, for example nitromethane, acetylacetone, acetoacetic acid ester, malonic acid nitrile, and the like, is also described.

Furthermore from German Pat. 855,441 relating to the preparation of oil-poor or oil-free lacquers, it is known that oil component products are obtained from the reaction of one mole of aluminum alcoholate with less than 2.5 moles of monocarboxylic acid having more than 4 carbon atoms. Aluminum alcoholates acylated in this ratio are readily mixable with the most important solvents and result in clear, transparent films which, however, are not completely resistant toward moisture, acids, and alkalis.

A method for the preparation of unsaturated aluminum resins is also described in German Pat. 1,088,719. In this method an aluminum alkylate, which by a known procedure has been stabilized with 0.5 to 1.5 moles of acetoacetic acid ester per mole of aluminum, is reacted with alpha, beta-unsaturated dicarboxylic acid anhydrides or their Diels-Alder addition products with cyclopentadiene or halogenated cyclopentadiene in a mole ratio between approximately 1 to 0.5 and 1 to 1.5, based on the aluminum content in the alcoholate, by heating to the boiling point.

Finally it has been proposed in German patent application No. R29238 IVd/39c (designated as P 15 20 628.7) to prepare synthetic organic aluminum compounds from aluminum alcoholates, dicarboxylic acid anhydrides, and alcohols in the ratio of 1 mole of alcoholate with 3 to 12 moles of acid anhydride.

Finally published German Provisional Pat. 1,025,824 discloses a process for making fiber materials water repellent with solutions of acylated aluminum alcoholates and/or phenolates. These solutions are obtained by reaction of the alcoholates or phenolates with 0.2 to 2.5, preferably 0.3 to 1.5 moles of acylation agent per mole of alcoholate or phenolate and which also contain chelating stabilizing agents, paraffins, waxes, and the like.

All these reactions of aluminum alcoholate with acylating agents such as monocarboxylic acids, half esters, or anhydrides of dicarboxylic acids and the like have one considerable disadvantage in common—the acylation products usually show a strong tendency to gel formation in an organic solution. For example, when a known acylating agent is added to an alcoholic solution of aluminum alcoholate, which may also contain a chelate-forming stabilizing agent, in a ratio of one equivalent of acylating agent per equivalent of aluminum or even less, the charge frequently gels. This gel formation is one of the reasons why the great majority of the known processes are limited to a low degree of acylation and even here frequently special precautionary measures are necessary.

It has now been found that this tendency to gelation of acylated aluminum alcoholates can be avoided or be substantially decreased even with higher equivalents of the acylating agents if certain acylation agents are used.

This invention relates to a method for the preparation at an elevated temperature of acylated alcoholates of polyvalent metals, preferably of aluminum, by reaction of metal alcoholates with monobasically reacting dicarboxylic acid derivatives, especially their half esters or anhydrides as an acylating agent, in mole ratios of 1:1 to 1:3, suitably in the presence of up to two equivalents of chelate-forming, stabilizing agents, and preferably in a solvent, preferably an alcohol corresponding to that of the alcoholate. The acylating agent employed in this process is a monoalkyl- or monoalkenylsuccinic acid anhydride whose side chain contains at least four carbon atoms or the mono-ester thereof.

As has been further found the acylation products prepared according to the invention not only have considerably lower gelling tendencies but are especially good for water repellency surface treatment of textiles, fiber materials, cardboard and the like. In addition, they have the property of adhering well to the surface of glass or mineral fibers.

One object of the invention is the use of these acylation products for making fiber material, carboard, textiles, and the like water repellent as well as for the surface treatment of glass and mineral fibers by which these fibers are sized and whereby the size, i.e., the coating, may serve as bonding agents for synthetic materials in which these fibers are embedded as reinforcing materials. Finally, it is also possible to use the acylation products prepared according to the method of the invention as adhesives for the elastic bonding of glass.

For the method according to the invention the alkylation products of maleic acid anhydride with isobutylene, di-isobutylene, or triisobutylene are primarily suitable as the acylation agents. The preparation of these materials is known and is not claimed herein. Hence, as is known, it is difficult to acylate aluminum alcoholates, which may suitably contain chelating agents such as acetonyl acetone or acetoacetic acid ester, with only one mole of maleic acid anhydride per mole of aluminum alcoholate without the reaction mixture gelling, it is surprising that this disadvantage is completely lacking if maleic acid anhydride is replaced by one of its alkylation products, e.g., isobutenylsuccinic acid anhydride, and that these alkenyl succinates in amounts of two and even three moles per mole of aluminum alcoholate may be used without difficulty.

Furthermore the acylation products prepared according to the invention are generally quite soluble in polar as well as non-polar solvents and these solutions are quite stable even in the presence of moisture. Furthermore films which have excellent adhesive power on glass surfaces can be easily obtained from these new acylation products.

As can be seen from the examples, the preparation and properties of the following compounds were more closely investigated. The acylation agents principally used in the examples were isobutenylsuccinic acid anhydride, for brevity referred to herein as "Iba"; diisobutenylsuccinic acid anhydride, "Diba"; and triisobutenylsuccinic acid anhydride, "Triba." The last two agents may also be named as octenylsuccinic acid anhydride and dodecenylsuccinic acid anhydride, respectively.

Aluminum isopropylate was generally used as the alcoholates and acetoacetic acid ethyl ester was used as the stabilizing agent.

The aluminum alcoholate was reacted with the acylation agent in a mole ratio of 1:1 to 1:2 and the reaction medium was isopropanol. Since 0–2 moles of a chelate forming stabilizing agent, acetoacetic acid ester, were used, the reaction products obtained had a composition, per aluminum atom according to the following table.

| | Number of— | | |
|---|---|---|---|
| Case No. | Alcoholate groups | Acyl groups | Chelate groups |
| 1 | 2 | 1 | |
| 2 | 1 | 2 | |
| 3 | 1 | 1 | 1 |
| 4 | | 1 | 2 |

In Case No. 1 and by using "Diba" as the acylation agent under the above conditions the product formed is monodiisobutenylsuccinic acid isopropyl ester-aluminum-diisopropylate, referred to herein as "Monodibaal."

With "Triba" as the acylation agent the product formed is mono-triisobutenylsuccinic acid isopropyl ester-aluminum-diisopropylate, referred to herein as "Monotribaal."

As a further example, with "Diba" as the acylation agent and acetoacetic acid ethyl ester as the chelating agent, the formula for the product formed according to Case No. 4 of the table above, "Monodibaal Dichelate," is shown below:

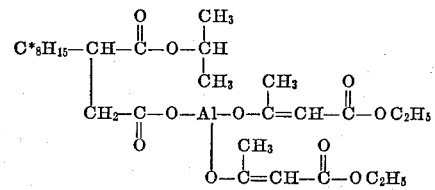

*Diisobutenyl (or octenyl).

The water repellency action of the acylation compounds according to the invention increases in proportion to the length of the alkyl or alkenyl side chain of the acylation agent. This is shown by a preliminary experiment in which solutions of the acylation product of iso-, diiso-, and triisobutenyl, as well as cyclohexenyl, succinic acid anhydride, each dissolved in perchloro ethylene in an amount of 1 wt. percent, were used to impregnate filter paper. After such treatment, the filter papers were dried. Then they were tested by adding two cc. of water dropwise to each of the impregnated filter papers in a petri dish. The papers treated with the products from isobutenylsuccinic anhydride had absorbed some water after approximately 30 minutes. With products containing longer chains, that is, more than four carbon atoms in the side chain, the water drops remains unchanged for several days on the filter paper. For most uses the water repellency action of the "Diba" products will be sufficient.

From the alcoholate solutions of the compounds prepared according to the invention films may be obtained which adhere firmly even to smooth supports such as glass plates and the like. These films are clear, colorless and very stable even after storage under water for several days. As is to be expected the compounds which still contain two unreacted alcoholate groups are more prone to hydrolysis than the stabilized compounds. The compounds which have not been stabilized should therefore be rapidly processed; the films obtained from them tend to shrink.

The compounds containing one mole of stabilizing agent however are resistant to hydrolysis and the films obtained therefrom are perfectly smooth and durable. They do not get dull nor do they become separated when they are stored underwater.

An even higher degree of stability, which is frequently not neven necessary, is shown by the acylated alcoholate stabilized with two moles of enol.

Regardless of the content of stabilizing agents, the alkenyl compounds of the invention are free of the undesirable phenomenon of "chalking out" of their films and the thus impregnated textiles are wrinkle free and soft to the touch.

For comparison, in addition to the aluminum compounds cited in the examples, the analogous compounds of titanium, zirconium and magnesium have been prepared. The titanium compounds proved to be stable to moisture but had lower adhesive power and elasticity. The zirconium compounds behaved similarly. The acylated magnesium alcoholates were not water resistant and their films got dull rapidly and after a very short time became detached from the glass plate used as a support. Of the compounds of the polyvalent metals named at the beginning, aluminum is thus preferred for the method of the invention.

The compounds obtained according to the invention not only are easily soluble in chlorinated hydrocarbons, alcohols, aromatics and similar materials but, if necessary, can be processed with paraffins, esterwaxes, and synthetic waxes to pastes of hard to lard-like consistency. For water repellency of fiber materials in general, 0.5 to 3 wt. percent of the compounds prepared by this improved process added to water repelling mixtures are generally sufficient.

The following examples illustrate the practice and advantages of the invention.

EXAMPLE I

In a flask equipped with a stirrer, a reflux condenser, a thermometer and an addition funnel were placed 204 grams (1 mole) of aluminum isopropylate and 274.7 grams of isopropanol. At room temperature with stirring there was added, dropwise, 210 grams (1 mole) of diisobutenylsuccinic anhydride ("Diba"), with precaution that the temperature did not rise above 70° C. After the addition of the anhydride to the reaction mixture, it was heated with reflux for about 1 hour at 85° C. After cooling a light yellow, clear, low viscosity product, diisobutenylsuccinic acid isopropyl ester-aluminum diisopropylate ("Monodibaal") was obtained. A 60% solution in alcohol of this material showed a viscosity at 20° C. of 1335 centipoises, a refractive index $n_D^{20}$ of 1.4277 and a density of $d_4^{20}$ of 0.9177 p./cm.$^3$ (pounds per cubic centimeter).

After prolonged heating under vacuum the product was not completely freed of the solvent. The osmometric molecular weight determination of less than 1000 instead of the calculated molecular weight of about 400 as well as the analytical values for the aluminum content (too low) and the carbon content (too high) indicate the formation of an associated compound.

EXAMPLE II

The process of Example I was repeated and then after the addition of the anhydride there was added dropwise 130 grams (1 mole) of the acetoacetic acid ethyl ester. The temperature was maintained below about 80° C.

The resultant acetoacetic acid ester monochelate of "Monodibaal Monochelate" was light yellow, clear and of low viscosity. A 60% solution in isopropanol had a viscosity at 20° C. of 47.5 centipoises, and $n_D^{20}$ of 1.4350 and $d_4^{20}$ of 0.9357 p./cm.$^3$.

The molecular weight of the substance freed in as far as possible from alcohol, was osmometrically determined at about 900. The calculated value is 484. For $$C_{24}H_{41}O_8Al$$

the values obtained upon analysis were: carbon content calculated of 59.5% versus C found of 58.4%, aluminum calculated of 5.59% versus aluminum found of 5.5%. The product appears to be the dimer of the expected compound.

EXAMPLE III

By using 260 grams (2 moles) acetoacetic ester according to the process of Example II, the acetoacetic ester dichelate or "Dibaal Dichelate" was obtained as a reddish-yellow, clear, low viscosity product. In 60% isopropanol solution, it exhibited a 20° C. viscosity of 26.5 centipoises $n_D^{20}$ of 1.4363, $d_4^{20}$ of 0.9394 p./cm.$^3$.

For $C_{27}H_{43}O_{10}Al$ the calculated molecular weight is 554 versus a determined value of about 800, C calculated of 58.5% versus C found of 60.2%, Al calculated at 4.88%, versus Al found of 4.65%.

EXAMPLE IV

The process of Example I was repeated with 420 grams (2 moles of "Diba." The bis(Diba)aluminum isopropylate was light yellow of low viscosity.

EXAMPLE V

In a round flask equipped with a reflux condenser, a thermometer, a stirrer and an addition tube, there was placed 204 grams (1 mole) of aluminum isopropylate and 260 grams of isopropanol. The mixture was well stirred. Then 266 grams (1 mole) of triisobutenylsuccinic acid anhydride ("Triba") was added dropwise at room temperature, and at such a rate that the temperature rose to about 70° C. At the end of the dropwise addition the mixture was allowed to reflux on a water bath for about a half-hour and then allowed to cool to 50° C. Thereafter 130 grams (1 mole) of acetoacetic acid ethyl ester was added dropwise whereby another rise in temperature to about 70° C. took place. After the addition of the stabilization agent, the mixture was allowed to reflux for one hour and then allowed to cool.

The resultant solution of the mono-triisobutenylsuccinic acid isopropyl ester-aluminum-monoisopropylate-monoacetoacetic acid ester chelate was light yellow, clear and of low viscosity. The unstabilized triisobutenylsuccinic acid isopropyl ester-aluminum-diisopropylate had, as a 60 wt. percent solution in isopropanol, a viscosity at 20° C. of 77.6 centipoises, a refractive index of $n_D^{20}$ of 1.4262 and a density of $d_4^{20}$ of 0.9092 p./cm.$^3$.

The water repellency action of the hereinproduced products of the invention was determined on the Krefeld standard cotton sample and cotton poplin and "Cottonova," registered trademark, which had been saturated with a solution of the acylation products and dried at room temperature. The samples were tested:

(1) For water repellent properties in the Rain Exposure Experiment according to Bendesmann (DIN 53,888, simplified):

Rain rate: 12 l/hr.
Drop fall height: 15 cm.
Test surface: 110 cm.$^2$
Test duration: 1 hour
Volume of collected water: 1150 cc.

The materials resistance to rain and the water shedding is reported by the DIN-evaluation method.

(2) For water resistance (DIN 53,886, Water Pressure Test, simplified):

Test surface: 35 cm.$^2$
Pressure height: Variable

According to this test, the surface is subjected to an increasing water pressure until water breaks through.

The following results were obtained.

(a) PERCENTAGE RAIN PERMEABILITY OF IMPREGNATED MATERIALS (UNTREATED MATERIAL EQUALS 100%) FOR DIFFERENT CONCENTRATIONS IN ISOPROPANOL

| Material | Percent weight | | |
|---|---|---|---|
| | 1 | 2 | 3 |
| Monotribaal, percent | 2.5 | >0.1 | (1) |
| Monodibaal, percent | 9.1 | 0.8 | <0.1 |
| Monodibaal-monochelate, percent | 43.7 | 19.1 | 8.4 |
| Monodibaal-dichelate, percent | 50.0 | 25.0 | 12.5 |

[1] Not measurable.

With tricholroethylene as the solvent, somewhat higher pentrabilities were found but the test results remained in the same relative order of magnitude.

(b) WATER PRESSURE TESTS WITH 3% SOLUTIONS IN ISOPROPANOL

Pressure height (mm.)
Non-impregnated material _____ 65
Monodibaal-dichelate _____ 210
Monodibaal-monochelate _____ 160
Monodibaal _____ 205
Monotribaal _____ 240

In further experiments the synergistic influence of the addition of paraffins to the products prepared according to the invention was determined. There was employed a completely refined paraffin wax (48°/50° C.) a so-called "block wax" mixed with the subject acylation products in a weight ratio of 1:2 and 2:1, dissolved in trichloroethylene. For comparison, a commercially available paraffin emulsion "VL 985," containing a zirconium salt was also evaluated.

The results are shown in the following table.

(A) PERCENT RAIN PENETRATION FOR TRICHLOROETHYLENE SOLUTIONS OF VARYING CONCENTRATIONS

| Substance | Percent weight | | |
|---|---|---|---|
| | 1 | 2 | 3 |
| Monotribaal, percent | 4.0 | 0.2 | (1) |
| Monotribaal/paraffin (2:1), percent | 0.3 | (1) | (1) |
| Monodibaal, percent | 7.5 | 0.6 | <0.1 |
| Monodibaal/paraffin (1:2), percent | 5.6 | 0.3 | <0.1 |
| VL 985, percent | (2) | 5.6 | 0.2 |
| Paraffin 48°/50° C., percent | 98.5 | 90.0 | 62.5 |

[1] Not measurable.
[2] Not determined.

NOTE.—Control, non-impregnated fabric=100%.

Paraffin alone at the low concentrations used had only a very slight water proofing effect.

(B) WATER SHEDDING EFFECT AND WATER RESISTANCE

| Substance | Water shedding effect | Water pressure height (mm.) |
|---|---|---|
| Monotribaal/paraffin (2:1) 3% in trichloroethylene | (5) | 250 |
| Monotribaal/paraffin (1:2) 3% in trichloroethylene | (4) | 235 |
| Monodibaal-monochelate/paraffin (1:2) 3% in trichloroethylene | (2) | 170 |
| Monodibaal-dichelate/paraffin (1:2) 3% in trichloroethylene | (2) | 170 |
| Aluminum-isopropylate/paraffin (1:2) 3% in trichloroethylene | (3) | 225 |
| VL 985–emulsion, 3% | (3) | 200 |
| Paraffin, 3% in trichloroethylene | (2) | 90 |
| Non-impregnated material | | 65 |

NOTE:
(5) (DIN 53,888): not attained.
(4) (DIN 53,888): Monotribaal (3 weight percent solution in isopropanol).
(3) (DIN 53,888): Monotribaal (3 weight percent in trichloroethylene or 2 weight percent in isopropanol).
(2) (DIN 53,888): Monodibaal (3 weight percent in isopropanol or trichloroethylene).

Impregnation with solutions containing less than 2% wt. Monotribaal and Monodibaal did not attain the results of note 3.

To prove the water repellency effect of the acylated products of the invention, various commercial cardboards (postal cartons, bookbinders' cardboard and the like) of varying area weights were used. The surfaces of the test samples (each 10 sq. cm.) were coated and the edges sealed. After cooling or drying, the coated cardboard test samples were immersed completely in water at room temperature for 1.5 hours. The amount of water taken up during this storage was determined.

The following coating agents and coating processes were compared:

Melt coating—with fully refined slab wax 54°/56° C.
Brushed on emulsion—with refined slab wax 54°/56° C., microcrystalline wax, 30 wt. percent ionic emulsion.
Brushed on emulsion—with fully refined slab wax 54°/56° C., microcrystalline wax, 40% non-ionic emulsion.
Brushed on dispersion—with fully refined slab wax 54°/56° C., microcrystalline wax, 12% in light naphtha.
Brushed on dispersion—as above, but also with the addition of 2% wt. "Monotribaal," based on the total ingredients.
External impregnation—with "Monotribaal" at various concentrations in isopropanol.

Results

The following values of percent water absorption of the impregnated test samples have been extrapolated to comparable area weights, (except the melt coat with paraffin which only at higher amounts of coating results in an impervious protective layer). The water absorption of the untreated test sample was taken as 100%.

| Impregnating substance | Amount of coating gm./m² | Percent water absorption |
|---|---|---|
| Paraffin, melt coat | 150 | 9.5 |
| Paraffin emulsion (mixed ionic) | 50 | 15.9 |
| Paraffin emulsion (non-ionic) | 50 | 12.7 |
| Paraffin dispersion | 50 | 6.7 |
| Paraffin dispersion plus 2% Monotribaal | 50 | 0.0 |
| Monotribaal: | | |
| 1% in IPA* | 10 | 74.0 |
| 2% in IPA | 10 | 36.0 |
| 3% in IPA | 10 | 26.5 |
| 5% in IPA | 10 | 19.5 |
| Monotribaal/paraffin (2:1), 1% in perchloroethylene | 10 | 8.0 |
| Monotribaal/parafin (2:1), 2% in perchloroethylene | 10 | 2.4 |
| Monotribaal/paraffin (2:1), 3% in perchloroethylene | 10 | 0.0 |

*IPA is isopropanol.

Further, the hydrolysis resistance of thin layers of products prepared by the invention was tested. As is known, organic aluminum compounds form whitish spots on dark bases caused by hydrolysis which is termed "chalking out."

For testing, black cardboard was impregnated, each time with 3% by weight solutions of the substances, and dried. The treated cardboards were exposed to air at a relative humidity of 90% for 8 days at 20° C. Except for the compounds containing aluminum isopropylate, no greying could be noticed for samples treated with the "Dibaal" and "Tribaal" water repellency agents. The water repellency action was fully maintained after the moist storage.

We claim:

1. A process of increasing the water repellency of textile, fiber or cardboard material which comprises contacting said material with an organic solvent solution of a mixture consisting essentially of an acylated aluminum alcoholate prepared by reacting aluminum alcoholate with an acylation agent selected from the group consisting of isobutenyl succinic acid anhydride, diisobutenyl succinic acid anhydride, triisobutyl succinic acid anhydride and the mono esters thereof wherein the mole ratio of alcoholate to acylation agent is 1:1 to 1:3, and drying the treated material.

2. A process according to claim 1 wherein the aluminum alcoholate is aluminum isopropylate.

3. A process according to claim 1 wherein the acylated alcoholate is prepared in the presence of a chelate building stabilization agent, the mole ratio of alcoholate to said stabilization agent being between 1.0 and 1:2.

4. A process according to claim 3 wherein the stabilization agent is selected from the group consisting of acetonyl acetone and acetoacetic acid ester.

References Cited

UNITED STATES PATENTS

| | | | |
|---|---|---|---|
| 2,980,719 | 4/1961 | Haslam | 260—429.5 |
| 3,271,310 | 9/1966 | Le Suer | 260—448 R |
| 3,485,858 | 12/1969 | Gee et al. | 260—448 R |

FOREIGN PATENTS

| | | | |
|---|---|---|---|
| 1,091,525 | 11/1967 | Great Britain | 260—429.5 |
| 1,088,719 | 9/1960 | Germany. | |

WILLIAM D. MARTIN, Primary Examiner

DAVID COHEN, Assistant Examiner

U.S. Cl. X.R.

117—140 R, 143 R, 154, 124 D, 126 GQ, GB; 260—448 R, 429.5, 429.3